July 24, 1928.

W. H. HOLMES

SELF TEACHING DEVICE

Filed Dec. 31, 1926

WITNESSES

INVENTOR
WILLIAM H. HOLMES
BY
ATTORNEYS

July 24, 1928.

W. H. HOLMES

SELF TEACHING DEVICE

Filed Dec. 31, 1926    2 Sheets-Sheet 2

| 7 | 4 | 2 |
|---|---|---|
| SHEEP | MOUSE | GOAT |

21. CHICKEN LITTLE TELL THE
22. THEY ALL RAN TO TELL THE KING

RAN     KING

*Fig. 5.*

| 1 | 2 | 4 | 5 | 6 | 7 |
|---|---|---|---|---|---|

*Fig. 6.*

| 7 | 6 | 5 | 4 | 2 | 1 |
|---|---|---|---|---|---|
| SHEEP | BEAR | CAT | MOUSE | GOAT | BEAR |

*Fig. 7.*

WITNESSES

INVENTOR
WILLIAM H. HOLMES
BY
ATTORNEYS

Patented July 24, 1928.

1,678,621

UNITED STATES PATENT OFFICE.

WILLIAM H. HOLMES, OF MOUNT VERNON, NEW YORK.

SELF-TEACHING DEVICE.

Application filed December 31, 1926. Serial No. 158,321.

The device of the present invention is designed not merely to aid in the teaching of various subjects to primary grade scholars but to promote self-education.

It is in the nature of a holder in which a number of members bearing interrogatory indicia may be removably associated with members bearing answers to the interrogatories or providing spaces in which the answers may be written by a child.

The device is peculiarly suited to the teaching of primary subjects, such as spelling, reading, mathematics, and the like.

An object of the invention is to provide a device of this character which not only greatly facilitates the work of the teacher but which will be amusing as well as instructive to the users and which permits an infinite variety of questions and answers to be set up.

A further object of the invention is to provide a device of this character in which the removal or replacement of indicia-bearing members may be readily accomplished by a small child; a device of simple practical construction which will be rugged and durable in use, and which lends itself readily to the requirements of economical manufacture.

With the above noted and other objects in view, the invention consists in certain novel features of construction and combinations and arrangements of parts, as will be more fully hereinafter set forth and pointed out in the claims. The invention may be more fully understood from the following description in connection with the accompanying drawings, wherein—

Fig. 3 is a view similar to Fig. 1 but illustrating a modified type of holder and showing two types of indicia-bearing members in position;

Fig. 4 is a vertical sectional view on the line 4—4 of Fig. 3;

Figs. 5 and 6 are plan views of the opposite sides of one of the folding indicia-bearing members of Fig. 3, and Fig. 7 is an edge view of one of said members.

Figure 1:
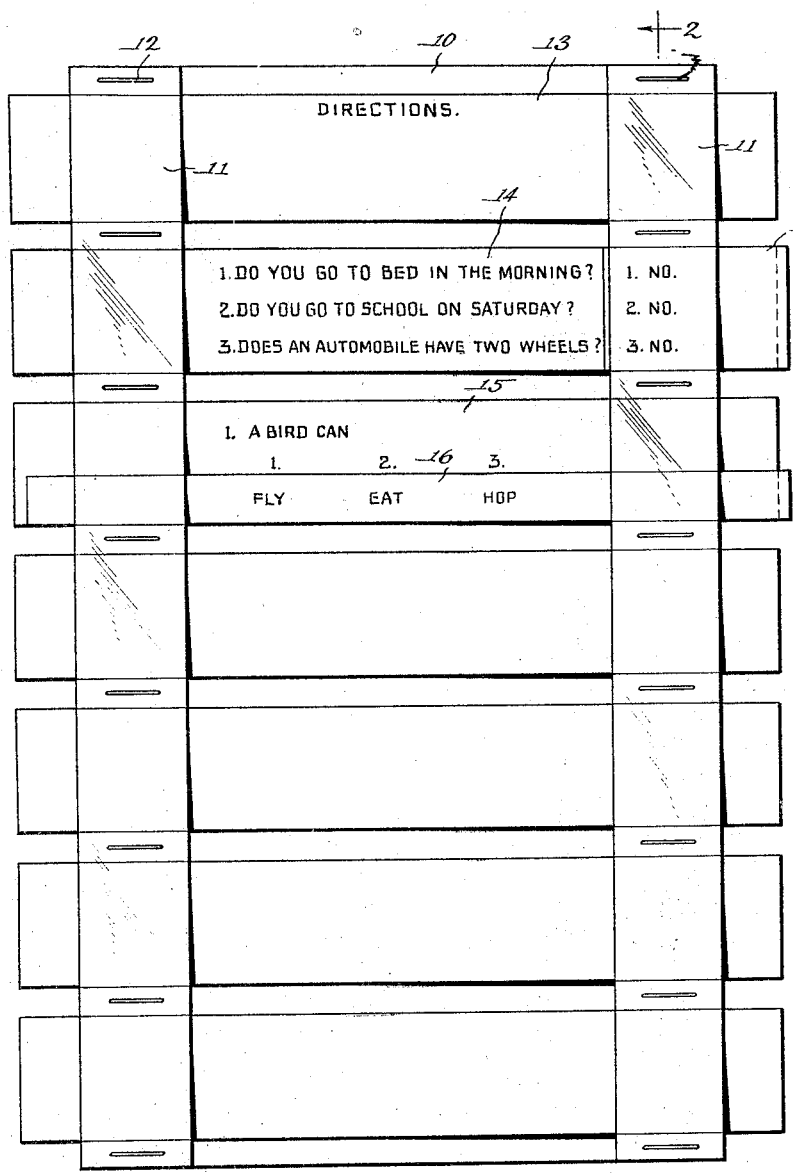
Figure 1 is a face view of a holder embodying the invention and showing two types of indicia-bearing members secured in position therein.
Figure 2:
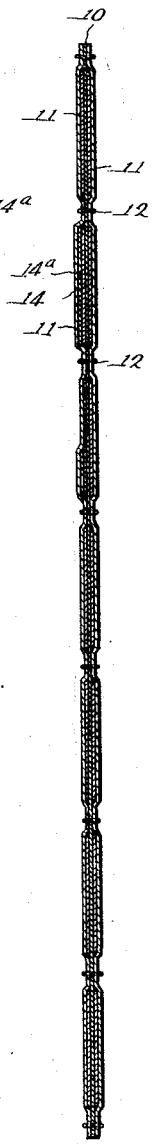
Fig. 2 is a longitudinal sectional view on the line 2—2 of Fig. 1.

Referring first to Figs. 1 and 2 of the drawings, I have used the reference character 10 to designate a flexible backing sheet preferably, although not necessarily, of flexible transparent material, such, for instance, as celluloid. Flexible transparent straps 11 extend along the longitudinal edges of the sheet 10, preferably on both faces thereof and are secured to the sheet by the use of securing devices, such, for instance, as staples 12 which penetrate the sheet 10 and its two overlying straps 11. The spaces between the staples 12 define relatively short straps or loops adapted to be used for retaining indicia-bearing members, such as 13, 14, 15 and 16, in position. The members 13, 14, 15 and 16 preferably comprise slips of paper entered under the short strap sections by a longitudinal sliding movement, and bearing interrogatory indicia on their faces. Inasmuch as the straps 11 are preferably of celluloid, the indicia on the slips may extend practically the full width thereof. The strips behind the sheet 10 will be protected against soiling until such time as they are desired for use under the front straps.

The slip 14, which is the second one from the top in Fig. 1, discloses three numbered interrogatories printed thereon. The child may answer the questions to these interrogatories by writing the numbered answers on a short slip of paper 14$^a$, which may be slid into position under one of the straps 11 in proper co-operative relation with the questions. If desired, a number of slips, such as 14$^a$, may be provided, some having the right answers and some having the wrong answers printed thereon, and the child will be required to pick out the slip having the correct answer. This form of the device is particularly useful for teaching reading. The questions are all obvious, and if the child does not answer them correctly, it will usually indicate that he does not read well enough to answer the questions.

Slip numbered 15, which is third from the top, may bear an interrogatory and a series of numbers adapted to coact with answers written by the child on the narrow slip 16. Slip 16 may be slid into position when blank, covering the lower edge of the slip 15, and the child will then write the answers to the interrogatory under the numbers on the slip 15. This form of the invention is more suitable for teaching spelling or for exercising the child's imagination.

Obviously the holder might have a wide range of utility and might bear all sorts of indicia carriers as well as those illustrated.

In Figs. 3 and 4 of the drawings I have illustrated a modified form of holder which consists of a backing sheet 20 preferably opaque, and a securing sheet 21 preferably of celluloid or equivalent transparent material which overlies the backing sheet. A plurality of transverse lines of stitching 22 secure the sheet 21 to the backing sheet 20 and define tubular pockets extending transversely of the backing sheet into which various indicia bearing members are adapted to be inserted by a sliding movement. If desired, the transversely extending tubular pockets may be sub-divided into two pockets by a longitudinal line of stitching 23 arranged at any desired location relative to the longitudinal axis of the holder.

A special type of indicia-bearing member designated generally by the reference character 25 has been shown in the pockets next to the upper pockets of Fig. 3 and also illustrated in Figs. 5 to 7, inclusive. The members 25 comprise elongated endless paper slips formed with transversely extending fold lines 26 which define spaces 27, each space being adapted to be numbered or identified as at 28. The fold lines 26 permit the slips or members 25 to be accordion folded whereby any space or series of spaces may be exposed and the members 25 then slid into position within the pockets. Preferably the spaces on opposite faces of the members 25 are similarly numbered, one set of spaces bearing a written identification and the other set of spaces bearing graphic identifications or pictorial representation of the matter set forth in the written spaces. As illustrated, one set of spaces bears the names of animals and the spaces on the opposite sides of the slips bear pictures of the animals. By using two of the members 25, one member may be folded, for instance, as shown in Fig. 3, and slipped into position, bearing the words "Sheep", "Mouse" and "Goat". The child will then refer to another of the members 25 and folded as illustrated, so that when slid into position it will show the pictures of a sheep, a mouse and a goat. The lettered spaces being numbered similarly to the picture-bearing spaces may greatly facilitate this operation. Of course, if desired, the members 25 might bear indicia only on one face but by printing them on both sides the child will be able to match up pictures with pictures, words with words, or words with pictures. The problem of properly folding the members 25 will also be interesting to the child and the device will materially aid in teaching spelling.

I have also shown in Fig. 3, in the fourth set of pockets from the top, a pair of indicia-bearing members 30 and 31, the former adapted to bear two questions and the latter adapted to bear two answers, the problem in this instance being to associate the correct answer to the correct question.

From the foregoing description it will be evident that the self-teaching device of the present invention is not only capable of embodiment in a wide range of forms, but is adapted for a wide range of utility and for teaching a number of subjects.

Obviously, various changes and alterations might be made in the general form and arrangement of parts described without departing from the invention. Hence I do not wish to limit myself to the details set forth, but shall consider myself at liberty to make such changes and alterations as fairly fall within the spirit and scope of the appended claims.

What is claimed is:

1. An indicia-bearing member for use in connection with a device of the class described, comprising an accordion folded strip having written indicia displayed on one face and graphic indicia displayed on its other face, the printed and graphic indicia corresponding in the corresponding spaces on opposite sides of the strip.

2. An indicia-bearing member for use in connection with a device of the class described, comprising an accordion folded strip having written indicia displayed on one face and graphic indicia displayed on its other face, the printed and graphic indicia corresponding in the corresponding spaces on opposite sides of the strip, corresponding spaces being similarly numbered.

3. An indicia bearing member for use in connection with a device of the class described, comprising an accordion folded endless strip having the names of objects displayed on one face and the pictures of the objects displayed in corresponding spaces on its other face.

WILLIAM H. HOLMES.